March 16, 1965 J. R. PATEL ET AL 3,173,802
PROCESS FOR CONTROLLING GAS PHASE COMPOSITION
Filed Dec. 14, 1961
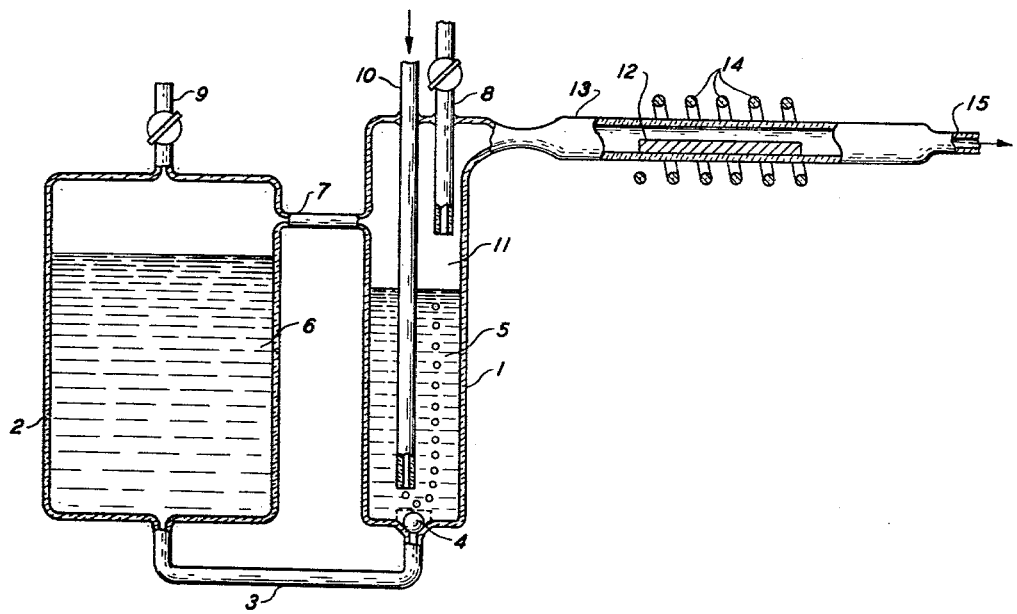
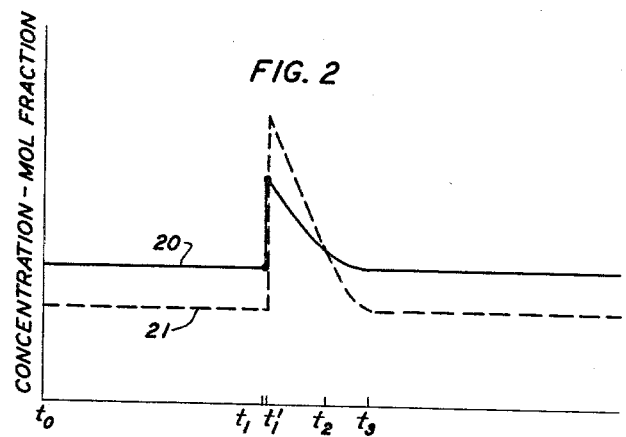
INVENTORS: J. R. PATEL
W. G. PFANN
BY
ATTORNEY

United States Patent Office 3,173,802
Patented Mar. 16, 1965

3,173,802
PROCESS FOR CONTROLLING GAS PHASE COMPOSITION
Jamshed R. Patel, Summit, and William G. Pfann, Far Hills, N.J., assignors to Bell Telephone Laboratories, Incorporated, New York, N.Y., a corporation of New York
Filed Dec. 14, 1961, Ser. No. 159,357
11 Claims. (Cl. 117—106)

This invention relates to processes for controlling the composition of a vapor phase which is being generated from a liquid, and to more complex processes including this method of composition control. The invention, which makes possible constant composition of a generated vapor phase containing components of differing volatilities, is of particular interest in the growth of epitaxial layers by condensation from such vapors. Procedures for varying vapor composition in a prescribed manner, useful, for example, in the production of p-n junctions, are described.

The semiconductor art has been responsible for the development of a host of procedures making possible the attainment of materials of extreme purity levels and manifesting compositional uniformity. One of the earlier, and now universally adopted processes, is that referred to as "zone melting," which takes cognizance of the difficulties introduced by the differing rates at which solutes freeze from solution. This relationship, oftentimes expressed in terms of $k$, the ratio of concentration of a given ingredient in the solid and the liquid phases, is utilized to prepare extremely pure materials and is overcome to permit the growth of crystalline material manifesting uniform composition.

By analogy, it is recognized that differences in concentration of different components on either side of a vapor-liquid interface cause enrichment with respect to the more volatile component or components in the vapor during vaporization. This mechanism has proven to be extremely useful, and has from early times been the basis for processes utilizing this distribution coefficient. An example of such a process is distillation. In a sense, distillation may be considered to be the vapor-liquid analog of that species of zone melting referred to as "zone refining."

With the growing interest in epitaxial techniques for manufacturing transistors, superconductive devices, and the like, workers in the art are becoming more aware of the unavailability of a convenient vapor-liquid analog for the species of zone melting called "zone leveling." Attempts to grow constant resistivity semiconductive epitaxial layers are thwarted by the natural tendency of more volatile components to accumulate in the vapor. The same mechanism makes difficult the attainment of superconductive layers of the proper uniform stoichiometry.

In accordance with the instant invention, a desired vapor composition containing at least two components is produced by liquid-vapor transformation from a first body of liquid while adding feed material of a composition enriched with respect to the more volatile component/components and at such a rate as to maintain the composition of the first body of liquid constant. In the simplest embodiment, feed flow is accomplished through a tube connecting the two bodies, the construction of the tube being such as to essentially prevent back flow. In this embodiment, flow is caused by equalization of the hydrostatic heads in the two bodies, both heads being maintained equal.

Although the invention is primarily directed to procedures for producing a vapor-phase material of constant composition, various techniques are described for perturbing the composition of the vapor. Where the vapor is condensed to produce epitaxial or other solid growth, the perturbation may, for certain semiconductive compositions, result in a resistivity gradient or p-n junction.

The inventive processes are generally applicable to any materials which may be caused to undergo a liquid to vapor phase transformation without deleterious reaction. The transformation may be effected by simple evaporation with or without heating means or may be accomplished with the aid of a reactive or inert carrier gas. Where such carriers are used, evaporation may be carried out at a free surface or, in accordance with a preferred embodiment, may be brought about by means of a bubble generator. The liquid composition must be single phase and may consist of a combination of elements, compounds, or both. As indicated, chemical reaction may or may not accompany the phase transformation.

The invention is more easily understood by reference to the accompanying drawing, in which:

FIG. 1 is a front elevational view, partly in section, of an apparatus suitable for use in the practice of the processes herein; and FIG. 2, on coordinates of concentration versus time, shows the variation in vapor composition for a perturbation species herein.

Referring again to FIG. 1, the apparatus consists of evaporating chamber 1 and feed chamber 2 connected by tube 3 designed to permit flow in one direction only. For the particular embodiment shown, back flow is prevented by use of ball valve 4. An alternate technique is to utilize a narrow diffusion-limited path. Liquid 5 undergoing phase transformation is contained within evaporating chamber 1. Liquid 6 in feed chamber 2 flows through tube 3 and ball valve 4 into the evaporating chamber 1, such flow being induced by equalization of the hydrostatic heads within the two chambers 1 and 2 upon removal of liquid from chamber 1 by phase transformation. The pressure heads in chambers 1 and 2 may be equalized as by use of a narrow interconnecting passage 7.

It is convenient to start up the apparatus by first feeding in liquid 5 through port 8 to the desired height and then by introducing liquid 6 through port 9 to a column height such as to result in precise equalization of the two heads (actual heights may differ due to density difference). This may be simply accomplished by adding liquid 6 until ball valve 4 rises slightly. With the liquids in the chamber, phase transformation is initiated at the free surface or by introduction of carrier gas into bubble generator 10. The use of a bubble generator is considered preferred where the apparatus is to be utilized in the preparation of constant composition vapor since the relatively large bubble interface area and long contact times permit the attainment of near equilibrium concentrations and, further, since the bubbles agitate the liquid 5, so preventing any appreciable concentration gradient. Where a bubble generator is not used, it is generally desirable to use some other agitating means. The vaporizing material 11 is initially of a composition determined by the composition of liquid 5, the concentration of any particular component being that determined by the relationship:

$$C_V = kC_l \qquad (1)$$

in which $C_V$ and $C_l$ are the mol fractions of the component in the vapor and liquid phases, respectively, and $k$ is the ratio of concentrations of the said component in the vapor and liquid at the interface.

Where the vapor product is used to generate a condensed layer on a substrate, this is conveniently accomplished by placing such substrate 12 in the vapor stream, as in connecting vessel 13. Where condensation is brought about by a thermal reaction, as in the hydrogen reduction of silicon tetrachloride, a heating means may taken the form of one or more convolutions of a resistance or inductive heater, which is depicted in schematic form as heater 14. Vapor material, either the entire product of the transformation or the residue after condensation, leaves the apparatus through exhaust port 15.

It has been noted that condensed layers are of interest to persons skilled in the semiconductor arts desirous of growing epitaxial layers for use in semiconductor translating devices. Other fields of interest include the superconductor art, thin layers being there indicated by the general advantages (increasing critical current, critical field, and critical temperature) which accrue as the dimension normal to current flow is decreased. Other uses include the growth of glassy or polycrystalline layers, the former for example acting as dielectric layers in condenser structures and the latter serving as substrates for deposited resistors.

FIG. 2, on coordinates of concentration in mol fraction and time, illustrates a composition perturbation produced in a crystallizing layer on a substrate by a technique herein. The particular system shown includes a base semiconductor such as silicon as well as an n-type conductivity inducing significant impurity 20 and a p-type conductivity inducing significant impurity 21. The impurities for this illustrative figure both are more volatile than the base semiconductor, with impurity 20 being more volatile than impurity 21. Operation is initially under nonequilibrium, stead-state conditions easily achieved for example by fairly rapid free surface evaporation or with a bubbler under conditions such that the bubbles are not saturated when they leave the liquid. Starting at time $t_0$, with no buildup whatever, and continuing to time $t_1$, it is seen that the concentrations of impurities 20 and 21 are constant, so that condensation of this material results in an n-type region of uniform resistivity. At time $t_1$, vapor flow out of the evaporation chamber is halted, so permitting the vapor there contained to attain static equilibrium with the liquid from which it was produced. Since impurity 21 is more volatile than 20 (has the greater value of $k$), the static equilibrium composition with respect to impurity 21 is increased relative to that of impurity 20 in the vapor phase. For the amounts shown, this increase is sufficient to result in an inversion so that p-type material 21 predominates in the vapor phase. After some interval required to attain static equilibrium, and at time $t_1'$ the vapor in the evaporation chamber is permitted to flow over the substrate, so initially condensing p-type material as indicated. For continued constant condition operation, the concentrations of both impurities return exponentially to their steady state values, crossing over at time $t_2$ and so producing a second p-n junction in the crystallizing material produced from this portion of the vapor. At time $t_3$, the system has returned to steady state conditions, with impurity 20 again predominating and having the same concentration relative to 21 as in interval $t_0$–$t_1$.

In its simpler embodiment, the relative cross-sectional areas of both the evaporation and feed chambers are a function of the system undergoing phase transformation. In such an embodiment, the ratio of areas is determined by the relative volatilities of a two-component system. The liquid contained in the feed chamber under these conditions is simply the pure component having the greater volatility. Where it is desired to operate with a different two-component system in existing apparatus, or where more than two components are present, it is necessary to include some of each of the components in the feed liquid. Design equations are considered below:

If the cross-sectional area, $A_2$, of column 2 is chosen correctly with respect to the area $A_1$ of column 1, the vapor leaving 1 will be of constant composition. (This assumes rapid mixing in 1, which a bubbler provides quite adequately.)

The required area ratio $(A_1/A_2)$ is given by:

$$\frac{A_1}{A_2} = \frac{M_0(1-x_2/x_1)}{M_2(1-x_0/x_1)} - 1 \qquad (2)$$

where

Subscripts 0, 1, and 2 refer to the product vapor (in the liquid state), the liquid in 1, and in 2, respectively, M denotes the average molecular weight of the solution, and $x$ denotes mol-fraction of heavy (less volatile) component.

The ratio $(x_0/x_1)$ may be called a distribution coefficient, $k$.

In terms of $M_H$ and $M_L$, the molecular weights of heavy and light components, respectively, (1) may be written:

$$\frac{A_1}{A_2} = \frac{[x_0 M_H + (1-x_0)M_L](1-x_2/x_1)}{[x_2 M_H + (1-x_2)M_L](1-k)} - 1 \qquad (3)$$

In general, it is preferable to have pure light component in column 2, that is, $x_2=0$, in which case (2) reduces to:

$$\frac{A_1}{A_2} = \frac{k + x_0\left(\frac{M_H}{M_L}-1\right)}{1-k} \qquad (4)$$

If the liquids in 1 and 2 differ in density, they will be at different levels. But if they do not, as when $x_0$ is very small, they will be at the same level. Equation 4 shows that the ratio $(A_1/A_2)$ depends only on $k$ at small $x_0$, but on $x_0$ as well, at larger $x_0$, because of the density difference which large $x_0$ introduces.

The apparatus can be adapted for solutions of different $k$-values by designing for small $k$ (that is $A_1/A_2$ small) and inserting inert glass rods in evaporating chamber 2 to reduce $A_2$ to the proper value.

Another approach is described below.

EXTENSION TO TERNARY OR HIGHER-ORDER SOLUTIONS

The method can be generalized to accommodate a higher-order system having solutes, $a, b, c \ldots (n-1)$ and "solvent," $n$. It is merely necessary to choose the proper mol-fractions, $x_{2a}, x_{2b}$, et cetera, of these solutes in the feed column. This is done by selecting $(A_1/A_2)$ to match the solute of lowest $k$ (call it solute "$a$"), with $x_{2a}=0$. It is then possible to choose values of $x_{2b}, x_{2c}$, et cetera, for which this same area-ratio will be correct.

Let R designate $(x_2/x_1)$; then, in accord with Equation 2, we may write:

$$\left(1+\frac{A_1}{A_2}\right)\left(\frac{M_2}{M_0}\right) = \frac{1-R_a}{1-k_a} = \frac{1-R_b}{1-k_b} = \frac{1-R_c}{1-k_c}, \text{ et cetera} \qquad (5)$$

It is evident from (5) that as $k$ increases (from component to component), R must also increase.

The generalized expression for $M_0$ is:

$$M_0 = x_{0a}M_a + x_{0b}M_b + x_{0c}M_c \ldots + x_{0(n-1)}M_{n-1} + (1 - x_{0a} - x_{0b} - x_{0c} \ldots - x_{0(n-1)})M_n \qquad (6)$$

An analogous expression holds for $M_2$.

The values of $(A_1/A_2)$ for $R_a=0$ is:

$$\frac{A_1}{A_2} = \frac{M_0}{M_2} \cdot \frac{1}{1-k_a} - 1 \qquad (7)$$

The value of $x_{2b}$, for $R_a=0$, is $$X_{2b} = X_{0b} \cdot \frac{1-k_a/k_b}{1-k_a} \qquad (8)$$

While the value of $x_{1b}$ is:

$$x_{1b} = x_{0b}/k_b \qquad (9)$$

Equations analogous to (8) and (9) hold for each of the other solutes.

All of the above equations obtain for any effective $k$ value/values that are maintained constant during the procedure. Generally, constancy in $k$ value demands constant transformation conditions, that is, temperature, flow rate, et cetera. Although temperature continues to be a factor, the use of a bubble generator minimizes the variation in $k$ with flow rate. As has been discussed, the invention is primarily adapted to the generation of constant composition vapor-phase material. However, as also indicated, intentional variations in processing conditions may be utilized to change the effective $k$ values and so to result in a vapor composition variation in accordance with a desired schedule. Where such variation is to result from changes in flow rate, this is most easily achieved by the use of a nonsaturated steady state carrier system, such as by surface evaporation with hydrogen carrier. Under these conditions, the average hydrogen to liquid contact time has an effect on the thickness, $\delta$, of the diffusion-limited surface layer in the liquid at the evaporating surface, with decreasing contact time (increasing rate) resulting in $k$ values numerically approaching 1. By the practice of processes such as that illustrated by FIG. 2 in the accompanying discussion, this may be used to produce desired variations in layers condensed from the vapor.

The following examples are illustrative of the inventive processes:

Example 1

In the production of the compound $V_3si$ by the thermal decomposition of a vapor containing 3 mols of $VCl_4$ to 1 of $SiCl_4$, vapor of the desired mol fraction, 0.75, of $VCl_4$ (the heavy component) is produced by filling column 1 with a liquid mixture containing the ratio 120 mols $VCl_4$ to 1 mol $SiCl_4$, and by filling container 2 to the same head as in container 1 with liquid $SiCl_4$.

The area ratio $A_1/A_2$ is calculated from Equation 2 as follows:

$$(x_2/x_1) = 0; \quad x_0/x_1 = \frac{0.75}{120/121} = 0.756$$

$$\frac{M_0}{M_2} = \frac{0.75(192.8) + 0.25(169.9)}{169.9} = 1.10$$

where 192.8 and 169.9 are the molecular weights of $VCl_4$ and $SiCl_4$, respectively.

$$\frac{A_1}{A_2} = \frac{(1.10)(1-0)}{1-0.756} - 1 = 3.51$$

In constructing columns 1 and 2 allowance should be made for the cross-sectional area of the bubble tube. A suitable dimension for column 1 is about one inch in diameter and about six inches in height (to the top of the liquid). A suitable carrier gas is hydrogen and a suitable flow rate is about one liter per minute at a mean pressure of about one atmosphere.

Example 2

To prepare an epitaxial layer of silicon containing $5 \times 10^{17}$ atoms of phosphorus per cm.$^3$, container 1 is filled with a liquid solution containing $2.14 \times 10^{-5}$ mol fraction of $PCl_3$ in $SiCl_4$, and container 2 is filled to the same head with pure liquid $SiCl_4$. The liquid in container 1 (or both containers) is maintained at zero degrees centigrade and hydrogen is bubbled through the liquid in container 1.

The area ratio, $A_1/A_2$, is obtained from Equation 2 using the values:

$M_0/M_2 = 1.00$,
$x_2/x_1 = 0$,
$x_0/x_1 = 0.44$ (ratio of vapor pressures of $PCl_3$ to $SiCl_4$)

Ratio $A_1/A_2$ is found to be 0.79.

The hydrogen gas containing the desired concentrations of $PCl_3$ and $SiCl_4$ is decomposed at a single crystal silicon substrate at a temperature of about 1270° centigrade, a preferred surface orientation for the substrate being the (111) plane.

The invention has, for simplicity, been described in terms of a limited number of materials and embodiments. The inventive processes are, however, advantageously utilized in the compositional control of any vaporous materials containing at least two components having volatilities differing by at least one percent, that is, in which a component has a $k$ value less than 0.99 or more than 1.01. Other changes, both in apparatus and in operating conditions, are considered obvious to those skilled in the art and are considered within the scope of this invention.

What is claimed is:

1. Method for producing a vapor containing at least two components having partial pressures differing by at least one percent by transforming liquid from a first liquid body containing the said components to a vapor while transferring liquid into the said first body from a second body of liquid, the liquid of the said second body having a composition relative to that of the first body which is enriched with respect to a more volatile component of the said first body, the said liquid flow being induced by a hydrostatic head difference in the said two bodies resulting from phase transformation and removal from the said first body in which the said first and second bodies are of substantially constant cross-sectional area over that portion of their height through which their upper surfaces range and in which the area ratio of the said constant cross sections are:

$$\frac{A_1}{A_2} = \frac{M_0(1-x_2/x_1)}{M_2(1-x_0/x_1)} - 1$$

where subscripts 0, 1, and 2 refer to the product vapor (in the liquid state), the liquid in the said first body and the liquid in the said second body, respectively, M denotes the average molecular weight of the solution, and $x$ denotes mol-fraction of heavy (less volatile) component.

2. Method of claim 1 in which phase transformation is at an essentially constant rate, and in which the composition of the said vapor remains essentially constant.

3. Method of claim 1 in which solid material is produced from the said vapor.

4. Method of claim 3 in which the said solid is produced as a condensed layer on a solid substrate.

5. Method of claim 1 in which the rate of phase transformation is at least once varied so as to produce a corresponding variation in the composition of the said vapor.

6. Method of claim 1 in which phase transformation is brought about by evaporation.

7. Method of claim 6 in which the rate of evaporation is increased by use of a carrier gas which is maintained in contact with the said first liquid body.

8. Method for producing a vapor containing at least two chloride-containing compounds having volatilities differing by at least one percent comprising contacting the surface of a first body of liquid containing the said chlorides with hydrogen which is unsaturated with respect to said chloride-containing compounds while causing liquid to flow into the said first body from a second body containing at least one of the said chlorides at a rate such as to equalize the hydrostatic heads of the two said bodies produced by evaporation and removal from the said first body, and condensing elemental material from the said vapor by thermal decomposition over a heated substrate in which the said first and second bodies are of substantially constant cross-sectional area over that portion of their height through which their upper surfaces range and in which the area ratio of the said constant cross sections are:

$$\frac{A_1}{A_2} = \frac{M_0(1-x_2/x_1)}{M_2(1-x_0/x_1)} - 1$$

where subscripts 0, 1, and 2 refer to the product vapor (in the liquid state), the liquid in the said first body and the liquid in the said second body, respectively, M denotes the average molecular weight of the solution, and $x$ denotes mol-fraction of heavy (less volatile) component.

9. Method of claim 8 in which the substrate is a single crystal, and in which the said elemental material deposits essentially epitaxially.

10. Method of claim 9 in which the deposited elemental material comprises a solid solution.

11. Method of claim 9 in which the deposited elemental material reacts to form a compound upon the said substrate.

References Cited by the Examiner

UNITED STATES PATENTS

| | | | |
|---|---|---|---|
| 2,699,927 | 1/55 | Gilroy et al. | 261—121 |
| 2,701,216 | 2/55 | Seiler | 117—200 |
| 2,721,813 | 10/55 | Holmberg | 75—63 |
| 2,824,621 | 2/58 | Carrier | 261—121 |
| 2,852,420 | 9/58 | Pohl | 148—1.6 |
| 2,892,739 | 6/59 | Rusler | 148—1.5 |
| 2,981,526 | 4/61 | Grumbach | 261—121 |
| 3,021,198 | 9/62 | Rummel | 23—223.5 |

OTHER REFERENCES

J. C. Marinace: "Epitaxial Deposition of Thin Films," I.B.M. Technical Disclosure Bulletin, vol. 4, No. 5, October 1961, pages 47–48.

DAVID L. RECK, *Primary Examiner.*

WINSTON A. DOUGLAS, *Examiner.*